United States Patent [19]

Bylund

[11] Patent Number: 4,525,109

[45] Date of Patent: Jun. 25, 1985

[54] CUTTING TOOL HAVING A CUTTING BLADE IN A SHANK SLOT

[75] Inventor: Sven O. Bylund, Sandviken, Sweden

[73] Assignee: Santrade Ltd., Lucerne, Switzerland

[21] Appl. No.: 569,490

[22] Filed: Jan. 9, 1984

[30] Foreign Application Priority Data

Jan. 18, 1983 [SE] Sweden ................... 8300230

[51] Int. Cl.³ .......................... B26D 1/00; B26D 1/12; B26D 3/00; B23P 15/28
[52] U.S. Cl. ...................... 407/36; 407/42; 407/54; 407/103; 407/110
[58] Field of Search .................. 407/36, 53, 54, 90, 407/103, 91, 109, 110, 42, 98; 408/143, 714; 82/DIG. 9

[56] References Cited

U.S. PATENT DOCUMENTS

| | | | |
|---|---|---|---|
| 2,621,548 | 12/1952 | Williams | 407/54 |
| 3,663,116 | 5/1972 | Muller et al. | 408/143 |
| 4,251,172 | 2/1981 | Durand | 408/228 |
| 4,437,802 | 3/1984 | Hall, Jr. | 408/197 |

FOREIGN PATENT DOCUMENTS 776770 11/1980 U.S.S.R. ............... 82/DIG. 9

Primary Examiner—Francis S. Husar
Assistant Examiner—William E. Terrell
Attorney, Agent, or Firm—Burns, Doane, Swecker & Mathis

[57] ABSTRACT

The present invention relates to a cutting tool for milling, boring or turning, comprising a holder shank (10) with a slotted end and a blade (13) clamped in the slotted end of the holder shank (10) by means of a clamping screw (16) which loosely extends through the blade (13). The blade (13) is provided with a recess (22) having radially displaced abutment surfaces (24A,24B) that are to abut outer edges (21A,21B) of the slot so as to radially center blade (13) in the slot (17) when tightening the screw (16). Furthermore, the invention relates to a blade (13) for use in connection with the above-mentioned holder shank (10).

10 Claims, 5 Drawing Figures

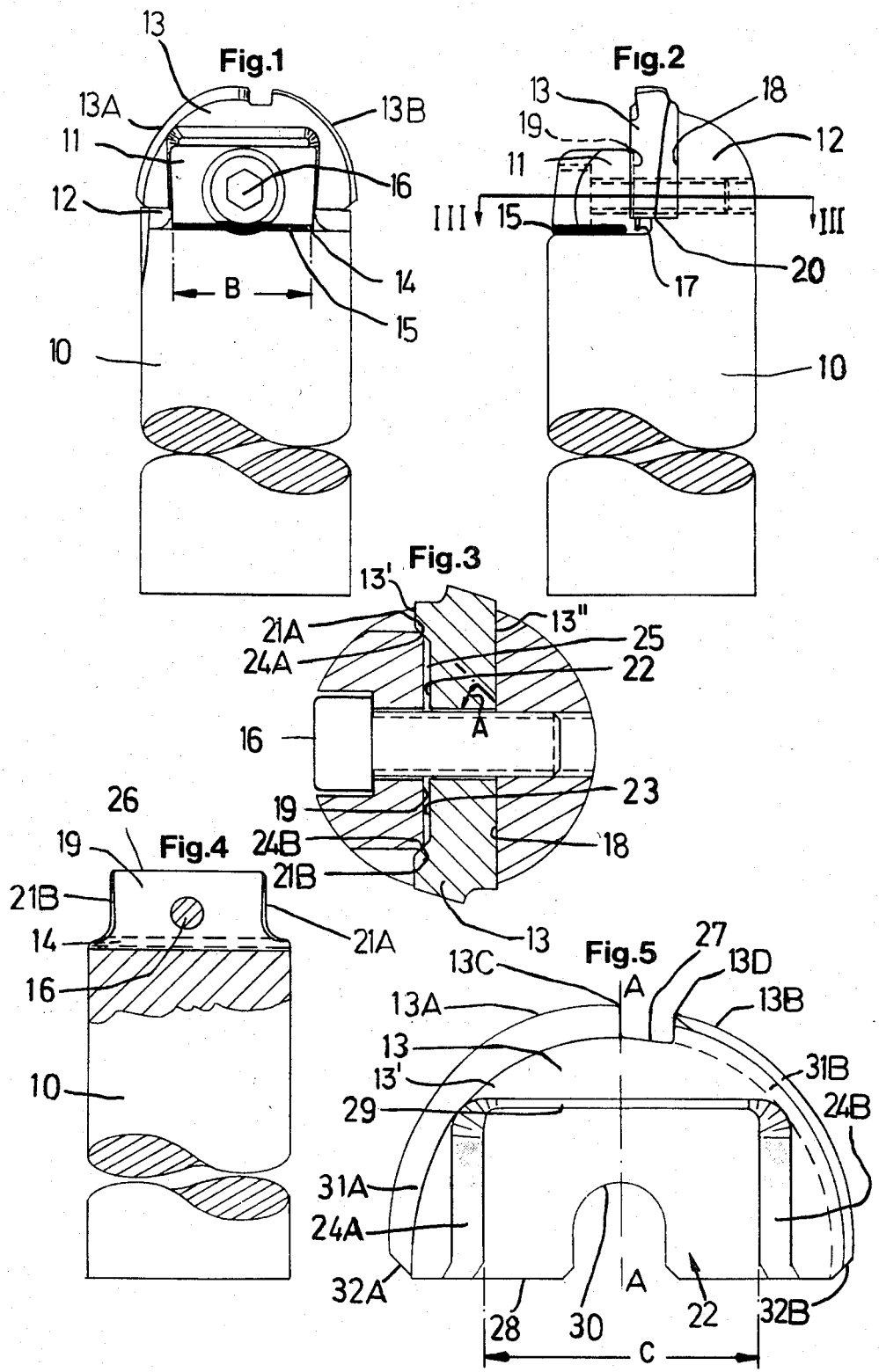

CUTTING TOOL HAVING A CUTTING BLADE IN A SHANK SLOT

BACKGROUND AND OBJECTS OF THE INVENTION

The present invention relates to a cutting tool for milling, boring or turning, in which a blade is clamped in the slotted end of a holder shank by means of a clamping screw which loosely extends through a hole in the blade and which is effective to squeeze the slotted end of the holder shank into gripping engagement with the blade. Furthermore, the present invention relates to a blade which is to be clamped in the slotted end of said holder shank.

According to U.S. Pat. No. 2,621,548 a cutting tool of the abovementioned type is previously known in which one side of the slot is provided with a rib which is to be received by a recess in the blade. The concave surface of the recess coincides with the convex surface of the rib whereby the radial positioning of the blade will occur directly as the blade is inserted in the slot of the holder. However, the surfaces have to be carefully machined to obtain a precise position and the surfaces are susceptible to wear. Furthermore, the blade is provided with a central hole to receive a screw that has to be fully unscrewed before any change of blade can be made.

The object of the present invention is to provide a cutting tool which solves the above-mentioned problems in a simple way. The essential part of the invention is that contact surfaces between a side of a slot and a recess of a blade are radially displaced relative to each other and that the contact surfaces are converging towards the other side of the slot in order to radially center the blade in the slot when tightening the screw. The screw is received through a groove in the blade allowing the blade to be slidably mountable in the slot without unscrewing the whole screw.

THE DRAWINGS

The above and other advantageous features of the present invention will hereinafter more fully appear from the following description considered in connection with the accompanying drawings in which:

FIGS. 1 and 2 are views in side elevation of a cutting tool embodying the present invention;

FIG. 3 is a cross-section view on enlarged scale taken along the line III—III in FIG. 2;

FIG. 4 is a partly sectional view of the holder shank in side elevation and

FIG. 5 is a plan view of a blade according to the present invention.

DETAILED DESCRIPTION OF A PREFERRED EMBODIMENT OF THE INVENTION

Referring first to FIG. 1 the cutting tool is provided with a holder shank 10 to be received in the chuck of a machine. The head portion of the holder shank 10 has two legs, one tightening leg 11 and one supporting leg 12. The radially inner surfaces of the legs 11, 12 are plane and form sides for a slot adapted to receive a blade 13 provided with two diametrically opposed cutting edges 13A, 13B. The holder shank 10 is provided with a channel 14 extending radially inwards towards a bottom of the slot which channel 14 limits the extension of the tightening leg 11 in the axial direction and thereby diminishing the flexural resistance. A cushioning material 15 is fitted into the channel 14 in order to dampen the vibrations otherwise influencing the tightening leg 11 during machining of the workpiece. The cushioning material 15 is made of rubber or metal. A clamping screw 16 extending transversely through the head portion of the holder shank 10 and in threaded engagement with the supporting leg 12, is adapted to clamp the blade 13 in the slot between the two legs 11, 12. The head of the screw 16 is provided with a polygonal key grip for making the turning of the screw possible with a suitable key tool. The head of the screw abuts only the upper part of the inner segment of a circle of a counterbore in the tightening leg 11 in order to obtain maximum lever arm on the tightening leg 11.

The cutting tool is shown in FIG. 2 being a view in side elevation perpendicular to the view in FIG. 1 depicting that the slot 17 and the blade 13 are axially parallel with the center line of the tool holder 10. The sides of the slot 17 are defined as 18, 19 respectively. The side 18 of the slot is provided with a support surface 20 that is supporting the blade 13 in axial direction. The support surface 20 consists of a longitudinal edge extending perpendicular to the side 18 which has a width approximately two thirds of the width of the slot 17. The support surface 20 forms a portion of the bottom of the slot 17.

In FIG. 3 being a cross-section view taken along the line III—III in FIG. 2 the blade 13 is tightened and centered between the sides 18, 19 of the slot 17. The opposed radially outer edges 21A, 21B of the side 19 are chamfered and substantially plane and converge towards the other side 18 of the slot, whereby each outer edge 21A, 21B forms an acute angle A relative to the radial direction of the side 18. The blade 13 has a recess 22 in one side. The recess 22 is provided with a substantially plane bottom 23 and two opposed chamfered abutment surfaces 24A, 24B, that are substantially plane and converging towards the other side of the blade 13. The surfaces 24A, 24B form the acute angle relative to said other side. Preferred angles according to the foregoing to obtain a distinct centering of the blade 13 without exposing the blade to tensile stress are acute angles 45° and 45°, respectively.

Centering of the blade 13 in the slot 17 is attained when tightening the screw 16. One of the radially outer edges 21A, 21B of the side 19 will then abut one of the chamfered abutment surfaces 24A, 24B of the recess 22, radially moving the blade 13 along the surface 20 until the other aubtment surface 24B, 24A abuts the outer edge 21B, 21A. Further tightening of the screw 16 will not displace the blade 13, but it will clamp the blade 13 in the slot 17 in the centered position. The plane side 19 of the slot 17 is longer than the plane bottom 23 of the recess 22 and therefore a clearance 25 exists between the side 19 and the bottom 23 when the blade 13 is in clamped position in order to avoid friction between the side and the bottom which would prevent the radial displacement of the blade 13.

In FIG. 4 there are shown the holder shank 10 partly in section comprising the channel 14 in dashed line, the side 19 of the slot, the outer edges 21A, 21B, the screw 16 and an edge 26 shaped as to avoid contact with the blade 13. In the figure the outer edges 21A, 21B are darkened implying surfaces in contact with the abutment surfaces 24A, 24B of the recess 22 in clamped position. The plane outer edges 21A, 21B are converging axially inwards at an angle B of about 2° so as to produce wedging of blade 13 at retraction of the cutting tool from the workpiece.

Referring now to FIG. 5 there is shown a blade 13 for use in connection with the holder shank 10 previously described. The blade 13 has a basic form similar to a semi-circular disc which consists of a hard material such as cemented carbide. The basic form may also be similar to a square or to a rectangular disc. The blade 13 is provided with two sides 13' and 13" and with two, diametrically opposed cutting edges 13A, 13B that are reaching from a cutting tip 13C, 13D, respectively, along the periphery to a base edge 28. The cutting tips 13C, 13D are spaced apart forming a chip space 27. The recess 22 is shaped in the side of the blade 13 that shall receive the side 19 of the slot 17 except the part of the side 19 that is situated axially inwards relative to the dolly 20. The recess 22 is limited by the substantially plane abutment surfaces 24A, 24B and a top edge 29 but is open at the base edge 28. The recess 22 is provided with a through groove 30, reaching a distance from the base edge 28 into the bottom 23 so as to receive the whole circumference of the screw 16 or a major part of it. The cutting tip 13C coincides with the center axis A—A of the blade 13 while the cutting tip 13D is placed radially apart from said axis. For obtaining a smooth and successive cutting incision which is important for cutting tools of this type, the cutting edges 13A, 13B successively deflect towards the opposite side of the blade 13. This can be done in different ways, for example through inclining of the sides of the blade so that they converge towards the base edge 28 or through forming a flute 31A, 31B with from the cutting tip 13C, 13D successively towards the base edge 28 increasing depth. The ends of the base edge 28 are chamfered and substantially plane forming retraction cutting edges 32A, 32B which are inclined about 45° relative to the plane of the base edge 28. The object of the retraction cutting edges 32A, 32B is to cut material at retractional movement of the tool. To counteract the retractional forces upon the blade subjected to extraction out of the slot, the abutment surfaces 24A, 24B are converging towards the base edge 28 similar to the convergence of the outer edges 21A, 21B of the side 19 and therefore the blade 13 is securely wedged in the slot 17. The abutment surfaces 24A, 24B converge axially inwardly to form an angle C of about 2° and in FIG. 5 they are darkened so as to illustrate the contact surfaces abutting the outer edges 21A, 21B of the side 19 of the slot 17.

Of course it is also possible to provide the other side 18 of the slot 17 with chamfered outer edges which shall cooperate with the recess 22 of the blade 13. With this shaping the blade will also be radially centered in the slot 17.

I claim:

1. A cutting tool for milling, boring, or turning comprising:
    a shank including a slot opening axially outwardly and defined by first and second mutually facing side surfaces which are each substantially planar, and a support surface disposed adjacent an axially inner end of said slot,
        said first side surface including a pair of radially spaced first contact surfaces which converge in a direction toward said second side surface, said first contact surfaces also converging in an axially inward direction,
    a cutting blade seated within said slot and having a base edge supported on said support surface and including third and fourth side surfaces facing said first and second side surfaces, respectively,
        said third side surface including a recess having a bottom wall and a pair of radially spaced second contact surfaces which are each substantially planar and converge toward said second side surface, said second contact surfaces converging in an axially inward direction,
        said blade including an axially extending groove which opens axially inwardly at said base edge,
    a clamping screw extending through a bore in one of said first and second side surfaces, and through said groove, and is threadedly mounted in the other of said first and second side surfaces to press said blade between said first and second side surfaces such that said pair of first contact surfaces are disposed within said recess and are forced against said pair of second contact surfaces to center and clamp said blade, said first side surface and said first contact surfaces being spaced from said bottom wall of said recess to form a clearance therebetween when said blade is in a clamped condition.

2. A cutting tool according to claim 1, wherein a substantial portion of said first side surface is received in said recess.

3. A cutting tool according to claim 1, wherein said first contact surfaces each form an acute angle relative to the plane of said second side surface, said second contact surfaces each form an acute angle relative to the plane of said second side surface.

4. A cutting tool according to claim 3, wherein said angles are each 45 degrees.

5. A cutting tool according to claim 1, wherein said first contacting surfaces are defined by radially outermost edges of said first side surface.

6. A cutting tool according to claim 5, wherein said first and second contact surfaces converge axially inwardly at an angle of about 2 degrees.

7. A cutting tool according to claim 5, wherein said shank includes first and second radially spaced, axially projecting legs which contain said first and second side surfaces, respectively, a channel extending radially into one of said legs from a radially outer periphery of said one leg adjacent an axially inner end of said slot, said channel terminating short of the one of said side surfaces associated with said one leg, said one leg being rendered more flexible by said channel.

8. A cutting tool according to claim 7, wherein a cushioning material is fitted into said channel.

9. A blade for use in combination with a cutting tool of the type comprising a shank which has a slot opening axially outwardly and including first and second mutually facing side surfaces and a support surface disposed adjacent an axially inner end of said slot, said first side surface including a pair of radially spaced first contact surfaces which are substantially planar and converge at a first angle in a direction toward sid second side surface, said first contact surfaces also converging at a second angle in an axially inward direction, said blade being adapted to be seated in said slot in engagement with said support surface and comprising:
    cutting edge means,
    a base edge located opposite said cutting edge means and adapted to engage said support surface,
    third and fourth side surfaces interconnecting said cutting edge means and said base edge and adapted to face said first and second side surfaces, respectively, said third side surface including a recess adapted to receive said first contact surfaces, said recess having a bottom wall and a pair of radially spaced second contact surfaces which are substantially planar and converge at said first angle toward said fourth side surface, said second side surfaces converging at said second angle toward said base edge, and a groove extending partway from said base edge surface toward said cutting edge means and being open at said base edge surface.

10. A blade according to claim 9, wherein said cutting edge means comprises two diametrically opposed cutting edges each being curved and extending to said base edge, each said cutting edge including a chamfered portion at the intersection thereof with said base edge.

* * * * *